US009660759B2

(12) United States Patent
Waheed et al.

(10) Patent No.: US 9,660,759 B2
(45) Date of Patent: May 23, 2017

(54) ADAPTIVE CYCLIC CHANNEL CODING FOR ORTHOGONAL FREQUENCY DIVISION MULTIPLEXED (OFDM) SYSTEMS

(71) Applicants: Khurram Waheed, Austin, TX (US); Karl F. Nieman, Austin, TX (US)

(72) Inventors: Khurram Waheed, Austin, TX (US); Karl F. Nieman, Austin, TX (US)

(73) Assignee: NXP USA, Inc., Austin, TX (US)

( * ) Notice: Subject to any disclaimer, the term of this patent is extended or adjusted under 35 U.S.C. 154(b) by 385 days.

(21) Appl. No.: 14/540,476

(22) Filed: Nov. 13, 2014

(65) Prior Publication Data
US 2016/0142175 A1    May 19, 2016

(51) Int. Cl.
 H04B 3/54    (2006.01)
 H04L 1/00    (2006.01)
 (Continued)

(52) U.S. Cl.
 CPC ............ *H04L 1/0003* (2013.01); *H04B 3/54* (2013.01); *H04L 5/006* (2013.01); *H04L 5/0087* (2013.01); *H04L 27/2601* (2013.01); *H04L 27/2646* (2013.01); *H04L 27/2662* (2013.01); *H04B 2203/542* (2013.01); *H04L 5/0007* (2013.01); *H04L 5/0044* (2013.01)

(58) Field of Classification Search
 CPC ..... H04L 1/0003; H04L 5/006; H04L 5/0087; H04L 27/2601; H04L 27/2646; H04L 27/2662; H04L 5/0007; H04L 5/0044; H04B 3/54; H04B 2203/542
 See application file for complete search history.

(56) References Cited

U.S. PATENT DOCUMENTS 8,743,974 B2 *  6/2014  Nassar ............... H04B 3/542
                                                 375/257
2001/0031016 A1  10/2001  Seagraves
2013/0051482 A1   2/2013  Nassar et al.

FOREIGN PATENT DOCUMENTS

EP            1643658 A1    4/2006

OTHER PUBLICATIONS

Neiman, K. et al., "Cyclic Spectral Analysis of Power Line Noise in the 3-200 kHz Band," 2013 IEEE 17th International Symposium on Power Line Communications and Its Applications, Mar. 24, 2013, 978-1-4673-6016-6/13; pp. 315-320.

* cited by examiner

*Primary Examiner* — Melvin Marcelo

(57) ABSTRACT

A method and apparatus for an orthogonal frequency division multiplexed (OFDM) communication system for communication in the presence of cyclostationary noise is provided. A receiver receives from a medium a channel measurement packet of a communication channel. The channel measurement packet has a measured transmission characteristic. The measured transmission characteristic of the received channel measurement packet is compared to a defined transmission characteristic to provide a comparison. A modulation coding scheme (MCS) map referenced to a phase of a cyclostationary noise period of the medium is generated based upon the comparison. The MCS map is sent to a transmitter via the medium. Signals including packets that have been mapped to subcarriers based on the MCS map are received from the medium. Subcarriers of the signals received from the medium are demapped using the MCS map referenced to the phase of the cyclostationary noise period of the medium.

20 Claims, 6 Drawing Sheets

(51) Int. Cl.
*H04L 27/26* (2006.01)
*H04L 5/00* (2006.01)

… (1)

ADAPTIVE CYCLIC CHANNEL CODING FOR ORTHOGONAL FREQUENCY DIVISION MULTIPLEXED (OFDM) SYSTEMS

BACKGROUND

Field of the Disclosure

This disclosure relates generally to communication, and in particular to orthogonal frequency division multiplexed (OFDM) communication.

Description of the Related Art

Communications systems attempt to provide communications over a communication channel that may be subject to varying amounts of various types of noise. For example, noise may exist at various frequencies or over various frequency ranges. As another example, noise may exist at various times or over various time periods. Noise at various times or over various time periods may occur with a relatively fixed relationship to temporally cyclical phenomena, such as cycles of an alternating current (AC) power line.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

A method and apparatus for an orthogonal frequency division multiplexed (OFDM) communication system for communication in the presence of cyclostationary noise is provided. The term cyclostationary refers to noise having characteristics that vary cyclically with time. A receiver receives from a transmission medium a channel measurement packet of a communication channel. As transferred, the channel measurement packet has a measured transmission characteristic that is obtained by the receiver. The measured transmission characteristic of the received channel measurement packet is compared to a defined transmission characteristic to provide a comparison. A modulation coding scheme (MCS) map referenced to a phase of a cyclostationary noise period of the medium is generated based upon the comparison. The MCS map is sent to a transmitter via the medium. Signals including packets that have been mapped to subcarriers by the transmitter based on the MCS map are received from the medium. Subcarriers of the signals received from the medium are demapped using the MCS map referenced to the phase of the cyclostationary noise period of the medium.

Figure 1:
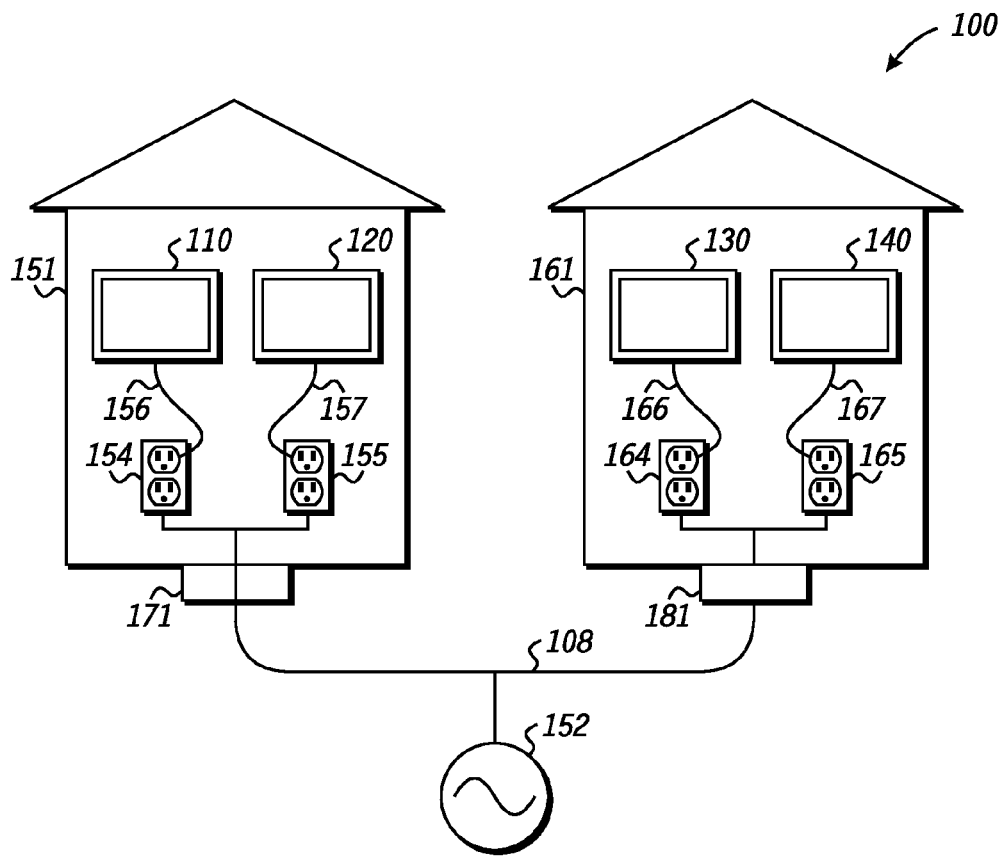
FIG. 1 is a block diagram illustrating a communication system 100 in accordance with one embodiment.

FIG. 1 is a block diagram illustrating a communication system 100, such as a power line communication (PLC) system, in accordance with one embodiment. Communication system 100 allows communication of a first device 171 with a second device 181 using PLC over power line 108. Power line 108 is provided from a power source 152, such as an electric power utility, to one or more electric power customer premises, such as a building 151, where first device 171 is located, and building 161, where device 181 is located. Building 151 and building 161 can, for example, be homes, offices, factories, or some other site to which power line 108 is provided. Power line 108 can be connected to power line receptacles, such as receptacles 154 and 155 in building 151 and receptacles 164 and 165 in building 161. A power cord, such as power cords 156 and 157 in building 151 and power cords 166 and 167 in building 161, can connect a device, such as first device 110 and second device 120 in building 151 and third device 130 and fourth device 140 in building 161, respectively, to power line 108 via receptacles 154 and 155 and receptacles 164 and 165, respectively. PLC can occur along between gateway devices, such as devices 171 and 181, between user devices in the same building, such as devices 110 and 120, between user devices in different buildings, such as devices 110 and 130, between a user device in one building and a gateway device in the same building, such as devices 110 and 171, and between a user device in one building and a gateway device in a different building, such as devices 110 and 181. PLC can also occur in the opposite direction along the same path.

Figure 2:
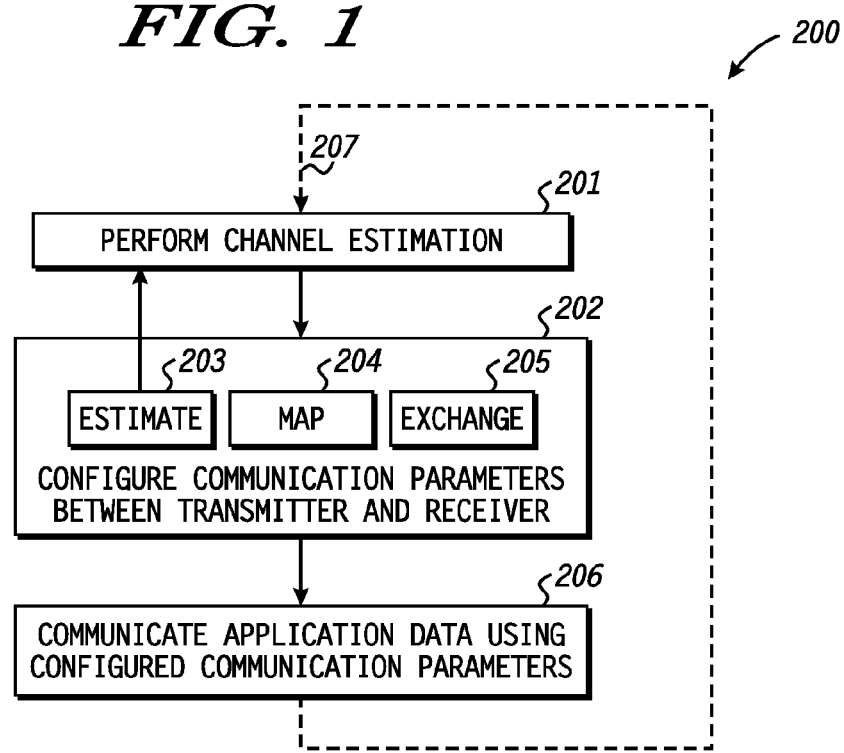
FIG. 2 is a flow diagram illustrating a method 200 for communication in a communication system in accordance with one embodiment.

FIG. 2 is a flow diagram illustrating a method 200 for communication in a communication system in accordance with one embodiment. Method 200 begins in block 201, in which channel estimation is performed at a receiver, for example. From block 201, method 200 continues to block 202. In block 202, communication parameters are configured between a transmitter and a receiver. Block 202 includes blocks 203, 204, and 205. In block 203, a previous channel estimate is provided to block 201 to aid in channel estimation. In block 204, a two-dimensional modulation coding scheme (MCS) map is produced by the receiver device. In block 205, the MCS map is exchanged with another device, e.g., a transmitter, with which communication is desired. From block 202, method 200 continues to block 206. In block 206, application data of an application for which the communication system is provided is communicated from the transmitter to the receiver using the configured communication parameters, as configured in block 202. From block 206, method 200 can return via loop 207 to block 201 to perform another channel estimation and to obtain updated communication parameters.

Figure 3:
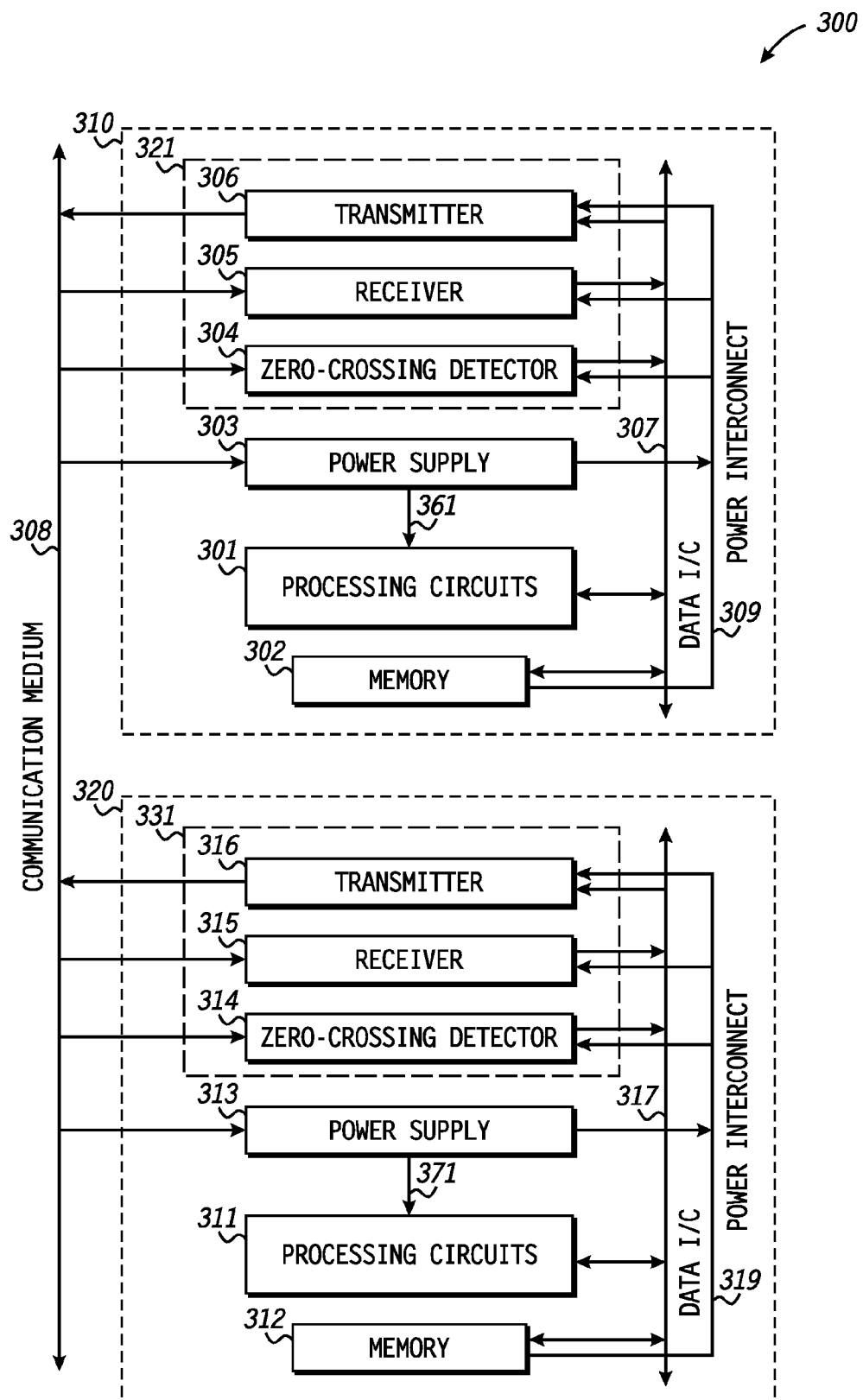
FIG. 3 is a block diagram illustrating a system 300 for time-frequency adaptive coding in accordance with one embodiment.

FIG. 3 is a block diagram illustrating a system 300 for time-frequency adaptive coding for OFDM PLC in accordance with one embodiment. System 300 includes a plurality of devices 310 and 320 connected to a communication medium 308. An example of a communication medium 308 is a power line over which communication, such as power line communication, for example, carrier current communication, may be provided.

Device 310 includes processing circuits 301, memory 302, power supply 303, and transceiver 321. Transceiver 321 includes zero-crossing detector 304, receiver 305, and transmitter 306. Power supply 303 is connected to communication medium 308. Power supply 303 can receive power from communication medium 308, for example, when communication medium 308 is a power line, and can provide power to processing circuits 301, memory 302, zero-crossing detector 304, receiver 305, and transmitter 306 via power interconnects 309 and 361. Zero-crossing detector 304 is connected to communication medium 308 and, for example, when communication medium 308 is an alternating current (AC) power line, can detect zero crossings (e.g., times at which the AC voltage crosses a zero value between the voltage extremes of the AC voltage) of communication medium 308. Zero-crossing detector 304 is connected to processing circuits 301, for example, via data interconnect 307, and provides a zero-crossing indication to processing circuits 301.

Receiver 305 is connected to communication medium 308, from which it receives communications, such as power line communications (PLC), for example, from another device also connected to communication medium 308. Receiver 305 is connected to processing circuits 301, for example, via data interconnect 307, and provides received data from communication medium 308 to processing circuits 301. Transmitter 306 is connected to processing circuits 301, for example, via data interconnect 307. Transmitter 306 receives from processing circuits 301 data to be transmitted over communication medium 308. Transmitter 306 is connected to communication medium 308 and transmits data to be transmitted over communication medium 308. Memory 302 is connected to processing circuits 301, for example, via data interconnect 307. Memory 302 may be used, for example, to store data to be transmitted over communication medium 308, to store data received over communication medium 308, or to store instructions to cause processing circuits 301 to process the data to be transmitted over communication medium 308, the data received from communication medium 308, or both.

Device 320 includes processing circuits 311, memory 312, power supply 313, and transceiver 331. Transceiver 331 includes zero-crossing detector 314, receiver 315, and transmitter 316. Power supply 313 is connected to communication medium 308. Power supply 313 can receive power from communication medium 308, for example, when communication medium 308 is a power line, and can provide power to processing circuits 311, memory 312, zero-crossing detector 314, receiver 315, and transmitter 316 via power interconnects 319 and 371. Zero-crossing detector 314 is connected to communication medium 308 and, for example, when communication medium 308 is an AC power line, can detect zero crossings of communication medium 308. Zero-crossing detector 314 is connected to processing circuits 311, for example, via data interconnect 317, and provides a zero-crossing indication to processing circuits 311.

Receiver 315 is connected to communication medium 308, from which it receives communications, such as power line communications (PLC), for example, from another device also connected to communication medium 308. Receiver 315 is connected to processing circuits 311, for example, via data interconnect 317, and provides received data from communication medium 308 to processing circuits 311. Transmitter 316 is connected to processing circuits 311, for example, via data interconnect 317. Transmitter 316 receives from processing circuits 311 data to be transmitted over communication medium 308. Transmitter 316 is connected to communication medium 308 and transmits data to be transmitted over communication medium 308. Memory 312 is connected to processing circuits 311, for example, via data interconnect 317. Memory 312 may be used, for example, to store data to be transmitted over communication medium 308, to store data received over communication medium 308, or to store instructions to cause processing circuits 311 to process the data to be transmitted over communication medium 308, the data received from communication medium 308, or both.

Accordingly, device 310 can transmit information to device 320, with processing circuits 301 providing the information to transmitter 306, which can transmit the information over communication medium 308 to receiver 315, which can provide the received information to processing circuits 311. Likewise, device 320 can transmit information to device 310, with processing circuits 311 providing the information to transmitter 316, which can transmit the information over communication medium 308 to receiver 305, which can provide the received information to processing circuits 301.

Figure 4:
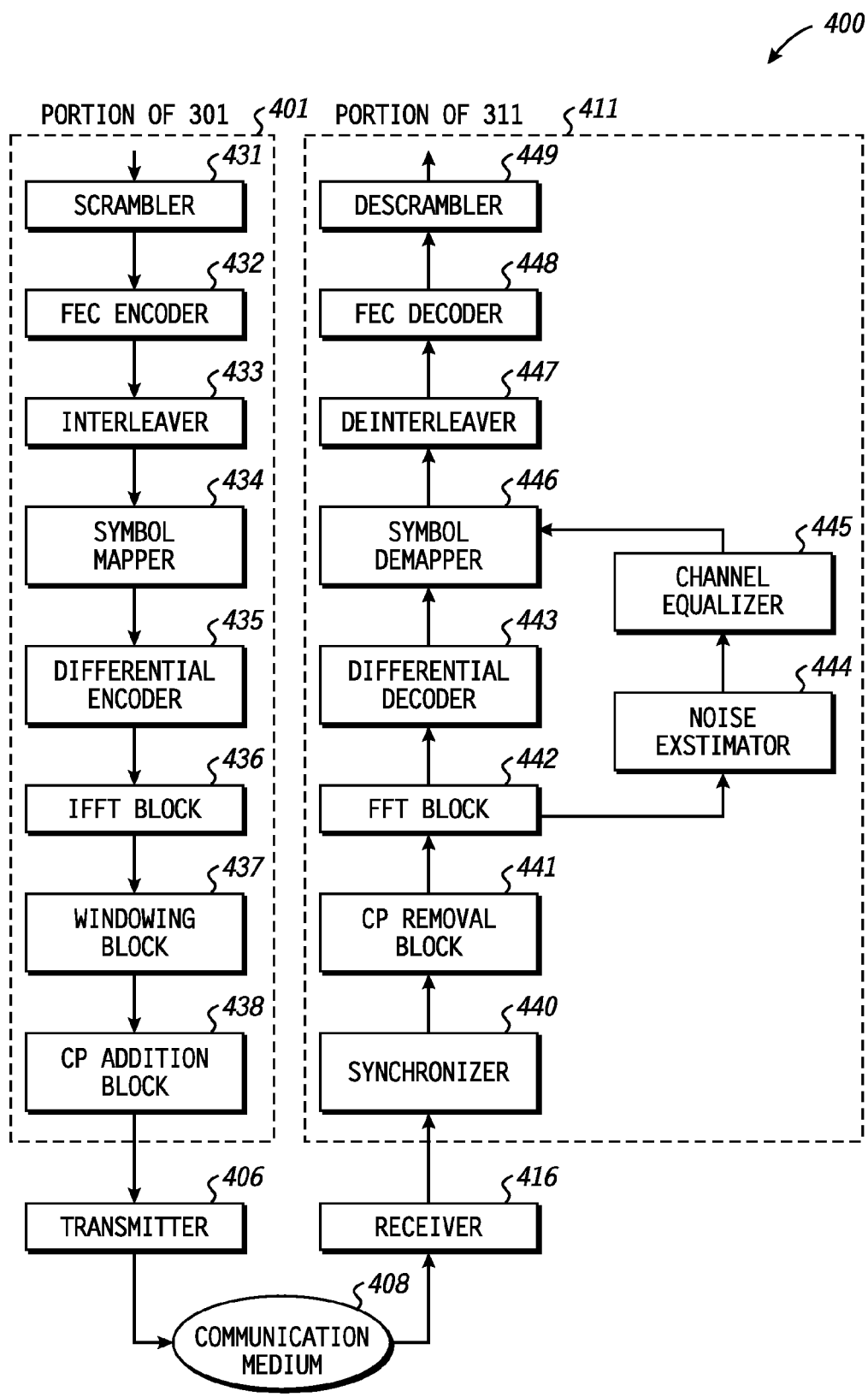
FIG. 4 is a block diagram illustrating a system 400 including circuits fusing time-frequency adaptive coding in accordance with one embodiment.

FIG. 4 is a block diagram illustrating a system 400 illustrating portions of FIG. 3 in greater detail for OFDM PLC communication using time-frequency adaptive coding in accordance with one embodiment. System 400 includes processing circuits 401, transmitter 406, communication medium 408, receiver 415, and processing circuits 411. In accordance with at least one embodiment, processing circuits 401 include a portion of processing circuits 301 of FIG. 3. In accordance with at least one embodiment, processing circuits 411 include a portion of processing circuits 311 of FIG. 3. Processing circuits 401 include scrambler 431, forward error correction (FEC) encoder 432, interleaver 433, symbol mapper 434, differential encoder 435, inverse fast Fourier transform (IFFT) block 436, windowing block 437, and cyclic prefix (CP) addition block 438. Processing circuits 411 include synchronizer 440, CP removal block 441, fast Fourier transform (FFT) block 442, differential decoder 443, noise estimator 444, channel equalizer 445, symbol demapper 446, deinterleaver 447, FEC decoder 448, and descrambler 449.

Data to be transmitted over communication medium 408 are provided to scrambler 431, which scrambles the data according to a scrambling pattern. The scrambled data are provided to FEC encoder 432, which performs FEC encoding so that errors occurring during communication can be corrected. The FEC encoded data are provided to interleaver 433, which interleaves the FEC encoded data, which can increase the performance of the FEC for bursts of errors in close proximity to each other during communication over communication medium 408. The interleaved data are provided to symbol mapper 434, which maps the interleaved data to symbols. Such symbols may be represented, for example, as having an in-phase (I) component and a quadrature (Q) component, where symbols for different data may lie at different points in an IQ plane. The symbols are provided to differential encoder 435, which encodes the data such that the encoding of a current data element is based on both the current data element and a previous data element. A representation of a signal at the output of differential encoder 435 is provided to IFFT block 436, which transforms the representation of the signal from the frequency domain to the time domain to provide a time domain representation. The time domain representation is provided to windowing block 437, which performs a windowing function on the time domain representation. The windowed time domain representation is provided to CP addition block 438, which adds a cyclic prefix to the time domain representation.

The cyclic prefixed windowed time domain representation is provided to transmitter 406, which transmits a signal based on the cyclic prefixed windowed time domain representation over communication medium 408 to receiver 415, which receives the signal and provides it or a representation thereof to synchronizer 440 of processing circuits 411. Synchronizer 440 synchronizes the received signal or representation thereof with the clock domain of processing circuits 411. The synchronized received signal or representation thereof is provided to CP removal block 441, which receives the cyclic prefix. The received signal or representation thereof with the CP removed is provided to FFT block 442, which transforms it into a frequency domain representation. The frequency domain representation is provided to differential decoder 443 and to noise estimator 444. Differential decoder 443 decodes the differential encoding by decoding each symbol based on the frequency domain representation for the current symbol and also the previous symbol, as differential encoding encodes the current symbol based on the previous symbol. The differentially decoded symbol is provided to symbol demapper 446. Noise estimator 444 estimates the noise present in the frequency domain representation and provides a noise estimate to channel equalizer 445. Based on the noise estimate, channel equalizer produces channel equalization information and provides it to symbol demapper 446. Symbol demapper 446 extracts information from the symbols based on their I and Q coordinates and provides the information to deinterleaver 447. Deinterleaver 447 performs the opposite of the interleaving performed by interleaver 403. Thus, any errors that were clustered together in bursts get spread out by the deinterleaver among a larger amount of information, thereby reducing the error density and increasing the ability of the FEC to correct the errors. The deinterleaved information is provided to FEC decoder 448, which performs any error correction in accordance with the FEC encoding provided by FEC encoder 432 and provides the error-corrected information to descrambler 449. Descrambler 449 descrambles the information according to the scramble pattern and outputs the descrambled information.

To provide time-frequency adaptive coding suitable, for example, for communication in the presence of cyclostationary noise, a transmission having a defined transmission characteristic can be processed by processing circuits 401 and transmitted by transmitter 406. Upon reception of the transmission at receiver 415, receiver 415 can measure a measured transmission characteristic obtained from the received transmission and compare the measured transmission characteristic to the defined transmission characteristic to obtain a comparison. The comparison can be used to modify the symbol map used by symbol demapper 446 and to send, via communication medium 408, the symbol map, as modified, or information to modify the existing symbol map to processing circuits 401 to be used by symbol mapper 434.

Figure 5:
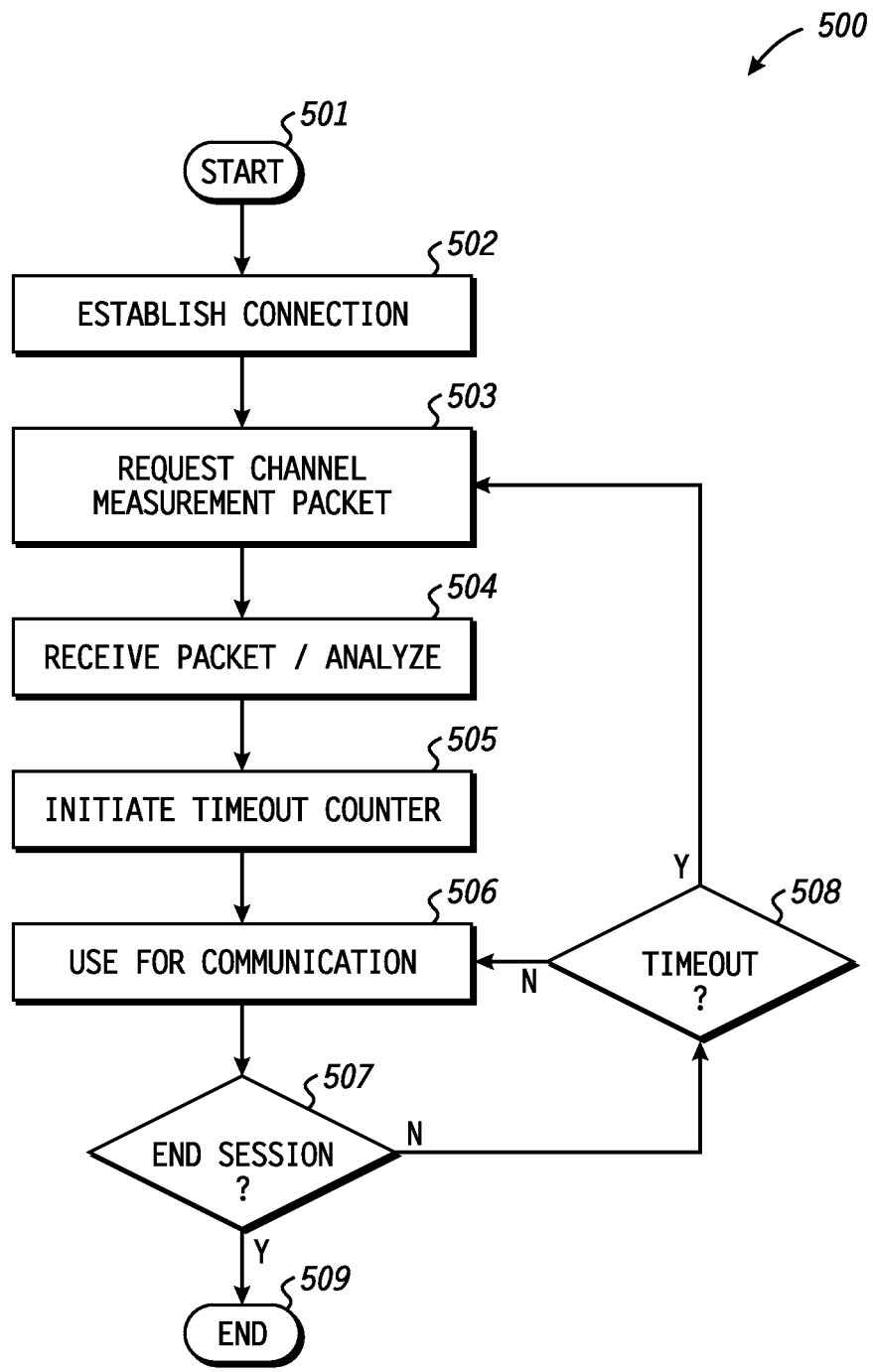
FIG. 5 is a flow diagram illustrating a method 500 for time-frequency adaptive coding in accordance with one embodiment.

FIG. 5 is a flow diagram illustrating a method 500 for time-frequency adaptive coding for OFDM PLC in accordance with one embodiment. Method 500 begins in block 501. From block 501, the method continues to block 502. In block 502, a connection between a transmitter and a receiver is established. From block 502, the method continues to block 503. In block 503, a channel measurement packet is requested to be sent from the transmitter to the receiver. From block 503, the method continues to block 504. In block 504, the channel measurement packet is received and analyzed. From block 504, the method continues to block 505. In block 505, a timeout counter is initiated. From block 505, the method continues to block 506. In block 506, parameters obtained from the analysis of the received channel measurement packet are used for communication. From block 506, the method continues to decision block 507. In decision block 507, a decision is made as to whether or not to end the session. If so, the method continues to block 509, where the method ends. If not, the method continues to decision block 508. In decision block 508, a decision is made as to whether or not the timeout counter has timed out. If so, the method returns to block 503. If not, the method returns to block 506. The channel measurement packet received in block 504 yields a measured transmission characteristic, which can be compared to a defined transmission characteristic upon which the transmission of the channel measurement packet was based. By analyzing, in block 504, the difference of the measured transmission characteristic from the defined transmission characteristic, the effect of cyclostationary noise on the communication channel over which the channel measurement packet is transmitted can be characterized and used to produce a modulation coding scheme (MCS) map for use in communication in block 506.

Figure 6:
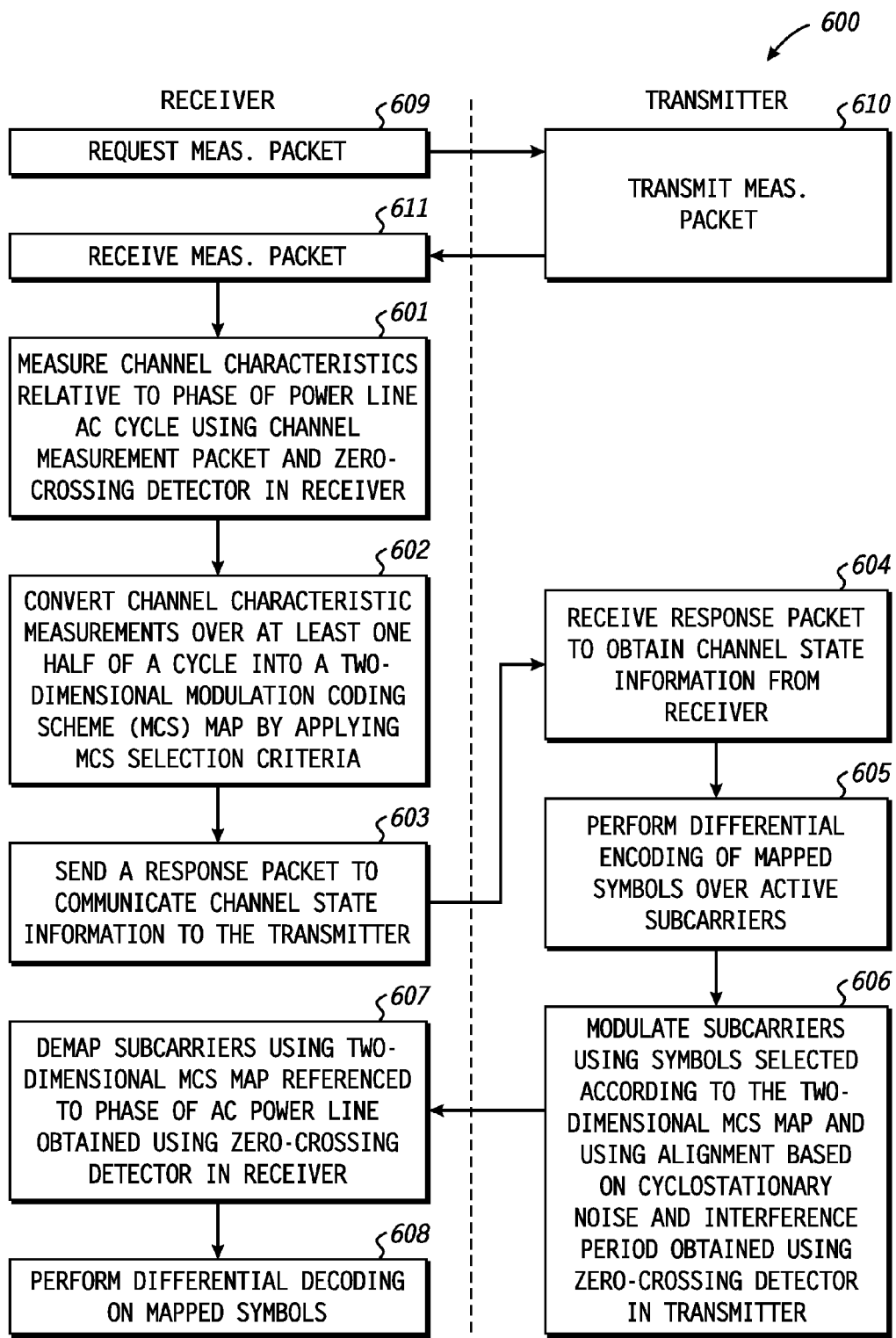
FIG. 6 is a flow diagram illustrating a series of methods 600 in accordance with at least one embodiment.

FIG. 6 is a flow diagram illustrating a series of methods 600 including a method for obtaining, at a receiver, and communicating, to a transmitter, channel state information in accordance with at least one embodiment, a method for receiving and using channel state information, at a transmitter, in accordance with at least one embodiment, and a method for using, at a receiver, a two-dimensional modulation coding scheme (MCS) map for receiving power line communications (PLC), in accordance with at least one embodiment. Methods 600 are illustrated with blocks performed by a receiver on the left and blocks performed by a transmitter on the right. As illustrated, the method including blocks 601 through 603 is performed by the receiver, then, according to this example, the method including blocks 604 through 606 is performed by the transmitter, and then, according to this example, the method including blocks 607 and 608 is performed by the receiver.

A process including methods 600 begins in block 609, which is performed by the receiver, where the receiver requests a measurement packet from the transmitter. From block 609, the process continues to block 610, which is performed by the transmitter, where the transmitter transmits a measurement packet to the receiver based upon a defined transmission characteristic, such as an expected message, that is known to the receiver. From block 610, the process continues to block 611, which is performed by the receiver, where the receiver receives the measurement packet. From block 611, the process continues to block 601.

At block 601, a method begins for obtaining, at a receiver, and communicating, to a transmitter, channel state information. In block 601, the channel characteristics of the medium are measured relative to the phase of a power line AC cycle based upon the received channel measurement packet and a zero-crossing indicator provided by the zero-crossing detector in the receiver. From block 601, the method continues to block 602.

In block 602, channel characteristic measurements over at least one half of a power line AC cycle are converted into a two-dimensional modulation coding scheme (MCS) map by applying MCS selection criteria. Such mapping can be performed by selecting a number of contiguous symbol time intervals occurring within and spanning a cyclostationary noise period when there is an integer number of symbols, such as OFDM symbols, per unit of cyclostationary noise, such as a half cycle of AC power. In an embodiment, interpolation may be used to track the phase of the cyclostationary noise period when OFDM symbols are not temporally aligned with instances of the cyclostationary noise period or multiples or submultiples thereof. Thus, for example, an interpolated MCS map may accommodate a non-integer number of symbols per unit of cyclostationary noise. From block 602, the method continues to block 603. In block 603, a response packet is sent from the receiver to communicate channel state information to the transmitter. The channel state information can include the MCS map obtained in block 602.

In an embodiment, the MCS map can be compressed in order to reduce messaging overhead. As an example, an indicator may be used to select and MCS map, or portion thereof, from a carefully designed set of precoding matrices. One approach to design a MCS map set is to apply 2-D vector compression techniques. These techniques are used to design a library of fixed-size primitives. These primitives are constructed by training on MCS map data and quantizing to a subset that minimizes reconstruction error. These quantized MCS maps can be designed by observing many PLC channel realizations. Multiscale processing can also be used. These techniques represent data features by a basis spanning multiple block sizes. Such compression methods have the possibility of achieving up to, for example, compression by a factor of ten times in the MCS map with minimal loss in communication performance.

The method for receiving and using channel state information, at a transmitter begins in block 604. In block 604, a response packet is received at the transmitter to obtain channel state information from the receiver. Thus, the transmitter obtains the same MCS map that the receiver obtained in block 602, so both the transmitter and receiver can use a common MCS map. From block 604, the method continues to block 605. In block 605, a differential encoding of mapped symbols over active subcarriers is performed. From block 605, the method continues to block 606. In block 606, the subcarriers are modulated using symbols selected according to the two-dimensional MCS map and using alignment based on power line AC cycle phase obtained using a zero-crossing detector in the transmitter.

An MCS map, or the values therein, may be selected to match conditions of the communication channel. As an example, selection may be based, at least in part, upon the signal-to-noise ratio (SNR) of the communication channel. According to one embodiment, in low SNR, receiver sensitivity is increased by lengthening the frame, and, in high SNR, link throughput is increased via higher bit density.

As an example, for a given SNR per subcarrier, values of an integer-valued matrix used to provide a 2-D MCS map are chosen to maximize a rate for a given channel realization. The rate is based on the fractional information rate of each MCS index, and MCSs can be set forth in order of increasing fractional information rates. In this case, when the SNR per subcarrier is greater than a minimum decodable SNR threshold for a given MCS matrix value, the corresponding subcarrier is said to be able to support the MCS matrix value. The minimum decodable SNR can be determined by comparing the values of a function that translates SNR to bit-error rate (BER) to a target BER for a MCS in additive white Gaussian (AWGN) noise. In certain circumstances, the minimum decodable SNR can be found for AWGN channels in closed-form using a nearest-neighbor union bound; otherwise, it can be determined numerically.

In practice, the target BER can be chosen to ensure that FEC used in the link would be able to correct for incurred bit errors with high probability. The available MCSs may be designed such that they share a similar target BER for each MCS, particularly if the same forward error correction (FEC) is applied agnostic to modulation (as is the case for a powerline communication protocol, such as G3-PLC). In G3-PLC, an inner convolutional (rate=½, K=7) code is wrapped with an outer shortened Reed-Solomon (N=255, K=239, T=8) and (N=255, K=247, T=4) codes (either chosen depending on modulation type), where the number N encoded symbols are created from number K source symbols and are able to correct the number T symbols as parameters for the Reed-Solomon coding. The former code allows for the correction of up to 16 byte errors in one 255 byte block in addition to errors corrected by the Viterbi decoder. Depending on desired block-error rate (BLER) for the system, the minimum decodable SNR threshold can be tuned according to MCS configurations.

A mapping of estimated SNR per subcarrier may be based on noise measurements. The optimal MCS based on a thresholding condition can be selected from those available in G3-PLC in a non-coherent (differential) mode. For example, a frame size bound may be applied for low SNR conditions. In the presence of low SNR, two approaches can be used to constrain frame size to a maximum allowable length. In the first approach, communicating devices will default to the most robust static modulation scheme (for G3-PLC, a robust static modulation scheme called ROBOx, which communicates only on bit per symbol, can be used). Second, a bit error-minimizing allocation scheme can be used. This scheme can provide a best effort to allocate bits into subcarriers that have the highest likelihood of decoding successfully even though they may not meet the SNR thresholds. This can be expressed by sorting the SNR estimate over several cycles in descending order and populating the corresponding subcarriers such that the upper bound of the frame size is no greater than the number of cycles over which the SNR estimate was sorted.

In accordance with at least one embodiment, phase referencing can be used for non-coherent modulation. Using the cyclic bit loading scheme outlined above, a practical consideration can be made for the phase reference when operating in non-coherent mode. In G3-PLC's non-coherent mode, symbols drawn from a M-PSK set, which defines specific symbols, are mapped differentially to subcarriers. The phase in a subcarrier k for an OFDM symbol l is the mapped phase $\psi(b)$ for bits b added to the phase reference (taken to be the phase from the previous OFDM symbol) $\phi_{k(l01)}$, according to $\phi_{kl}=\phi_{k(l-1)}+\psi(b)$. When using cyclic bit allocation, the phase information in unallocated subcarriers is typically corrupted by virtue of their low SNR; thus, it is advantageous to use the last successfully mapped subcarrier k for a phase reference—i.e., $\phi_{kl}=\phi_{kla}+\psi(b)$, where la is the most recent OFDM symbol with allocated subcarrier k. Unallocated subcarriers can be populated with pseudonoise (PN) data mapped to D8PSK symbols. This preserves the spectral shape and time-domain amplitude statistics of the transmit signal.

The method for using, at a receiver, a two-dimensional modulation coding scheme (MCS) map for receiving power line communications (PLC) begins in block 607. In block 607, subcarriers are demapped using a two-dimensional MCS map referenced to the phase of the AC power line obtained using a zero-crossing detector in the receiver. As noted above, since the MCS map obtained at the receiver in block 602 is communicated to the transmitter in blocks 603 and 604, the receiver uses the MCS map of block 602 to demap the subcarriers in block 607 that were modulated in block 606 by the transmitter using the same MCS map of block 602.

Depending on a mathematical relationship of symbol timing to a period of cyclostationary noise, symbols, such as OFDM symbols, may or may not be temporally aligned with instances of the cyclostationary noise period or multiples or submultiples thereof. For example, in 60 Hz regions, there are what can practically be considered an integer number of OFDM symbols for G3-PLC per AC half cycle—e.g., $0{:}5 f_S T_{AC}/N_{OFDM} = 11.99041 \approx 12$, where $f_S$ is the system sample rate in samples per second, $T_{AC}$ is the duration of the cyclostationary noise period in seconds, and $N_{OFDM}$ is the number of samples per symbol. For different values of $f_S$, $T_{AC}$, and/or $N_{OFDM}$, an integral relationship in time between symbols and cyclostationary noise period may not always be the case.

When a non-integer number of symbols per cyclostationary noise period occur, the MCS map needs to be updated in order to maintain alignment with the cyclostationary noise phase, e.g., AC cycle phase. One of the simplest methods is to apply nearest neighbor selection, in which the phase is tracked, and the MCS map is indexed by the closest match to the current cycle phase. Other, more precise interpolation methods can be implemented to provide higher SNR per subcarrier accuracy as the AC cycle drifts. Phase information can be included in the 2-D MCS message that will allow the sample map to be invertible. Sampling intervals may also need to be adjusted to guarantee invertibility—e.g., CP samples should not be removed and the noise should be sampled at a rate critical to guarantee invertibility via the short time Fourier transform (STFT) invertibility criterion for active subcarriers k. In this case, the SNR per subcarrier metric can be inverted back to the time domain and reprocessed to account for the cycle phase shift. As shown in the example, above, an integer number of symbols per cyclostationary period can include, as one example, values within a hundredth of a symbol per cyclostationary period of an integer number of symbols per cyclostationary period and, as another example, values within 0.1% of an integer number of symbols per cyclostationary period. Likewise, a non-integer number of symbols per cyclostationary period can include, as one example, values not within a hundredth of a symbol per cyclostationary period of an integer number of symbols per cyclostationary period and, as another example, values not within 0.1% of an integer number of symbols per cyclostationary period.

From block 607, the method continues to block 608. In block 608, differential decoding is performed on the mapped symbols.

As an example, in a PLC system, cyclostationary noise may be present with a cyclostationary noise period of, for example, a quarter of a power line cycle for inductive motors, a half of a power line cycle for full-wave rectifiers, and a full power line cycle for lighting and half-wave rectifiers. By configuring an embodiment of the described method or apparatus for a longer one of multiple cyclostationary noise periods for which cyclostationary noise is present, the embodiment can also compensate for one or more shorter ones of the multiple cyclostationary noise periods, thereby providing a solution effective against effects of cyclostationary noise of multiple different cyclostationary noise periods.

Figure 7:
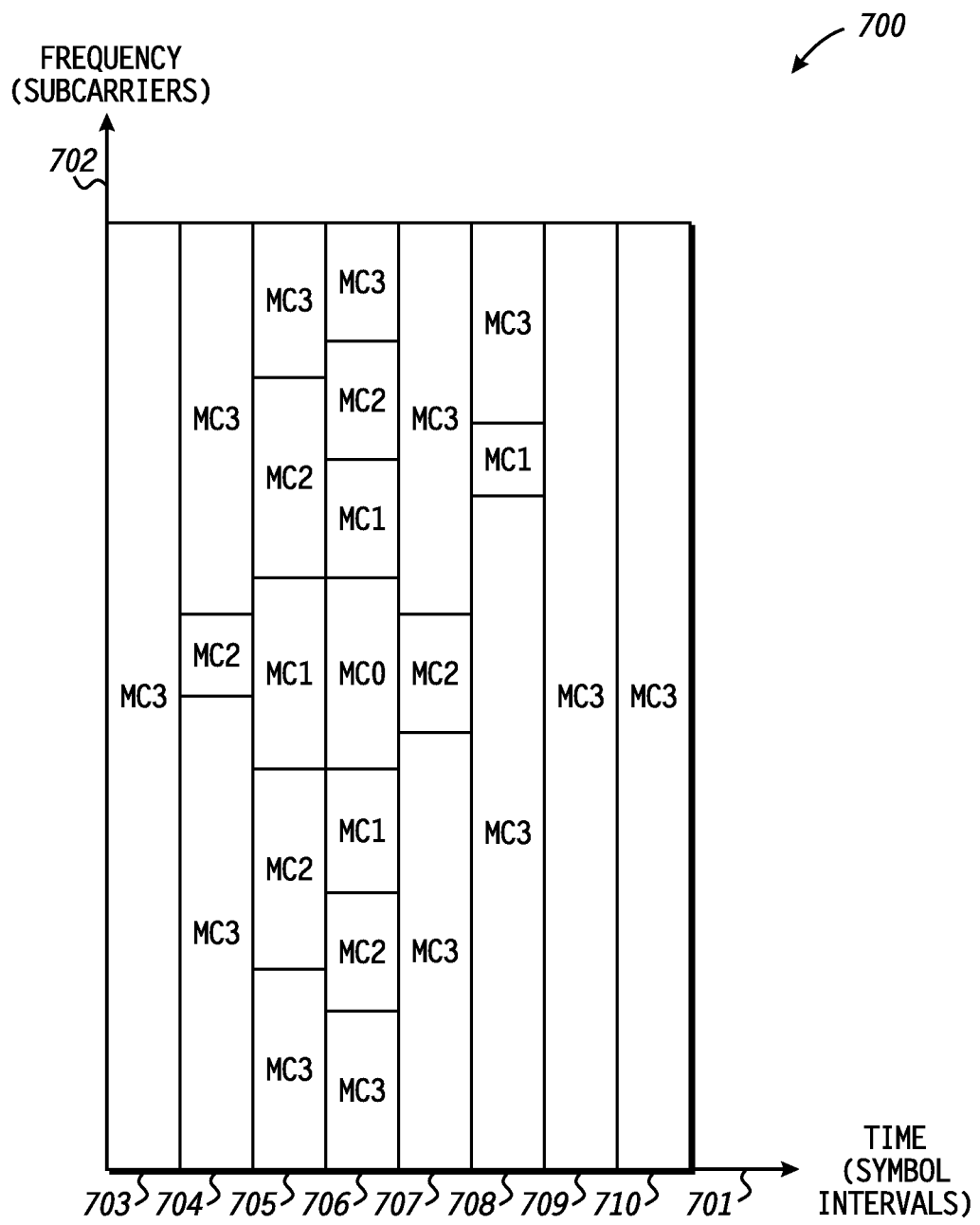
FIG. 7 is a two-dimensional diagram illustrating a two-dimensional modulation coding scheme (MCS) map 700 in accordance with at least one embodiment.

FIG. 7 is a two-dimensional diagram illustrating a two-dimensional modulation coding scheme (MCS) map 700 in accordance with at least one embodiment. MCS map 700 is organized with respect to time axis 701 and frequency axis 702. Time axis 701 is incremented in time intervals 703-710. Time intervals 703-710 can be, for example, symbol intervals. Map entries for each of time intervals 703-710 specify the modulation and coding schemes (MCS) to be used during the respective time intervals. MCS map 700 includes a sufficient number of time intervals to span at least one cyclostationary noise period, for example, at least a half cycle of an AC power cycle. Frequency axis 702 is incremented in frequency increments, which can, for example, correspond to the spacing, in frequency, of subcarriers. Map entries can be provided for any symbol interval and any subcarrier and for grouping thereof.

In the example illustrated in FIG. 7, four MCS variations, MC0-MC3, providing ranges of rate and robustness, are shown. MC0 provides the lowest rate but the highest robustness. MC1 is less robust but provides a higher rate. MC2 is still less robust but provide a still higher rate. MC3 is least robust but provides the highest rate. As an example, MC0 may specify binary phase shift keying (BPSK), MC1 may specify quadrature phase shift keying (QPSK), MC2 may specify quadrature amplitude modulation (QAM) with a constellation of 16 possible symbol values (QAM-16), and MC3 may specify QAM with a constellation of 64 possible symbol values (QAM-64).

MCS map 700 specifies MCS variation MC3 for all subcarriers over time interval 703 based on a relative absence of noise and correspondingly high SNR over time interval 703. As some noise begins to appear over one or very few subcarriers in time interval 704, MCS map 700 specifies MCS variation MC2 for that one or those very few subcarriers and MC3 for the remaining relatively noise-free subcarriers during time interval 704. As the noise becomes more severe and affects a larger range of subcarriers in time interval 705, MCS map 700 specifies MCS variation MC1 over a central range of subcarriers affected by the noise, MCS variation MC2 over peripheral ranges surrounding the central range, and MCS variation MC3 over the remaining relatively noise-free subcarriers during time interval 705. As the noise becomes still more severe and affects a still larger range of subcarriers in time interval 706, MCS map 700 specifies MCS variation MC0 over a central range of subcarriers affected by the noise, MCS variation MC1 over peripheral ranges surrounding the central range, MCS variation MC2 over extended peripheral ranges surrounding the central range, and MCS variation MC3 over the remaining relatively noise-free subcarriers during time interval 706. As the noise begins to lessen in time interval 707, MCS map 700 specifies MCS variation MC2 for the one or very few subcarriers where noise remains and MC3 for the remaining relatively noise-free subcarriers during time interval 707. By time interval 708, the noise affecting the one or very few previously affected subcarriers is gone, but moderately intense but very narrowband noise has appeared, affecting one or a very few subcarriers higher in frequency. MCS map 700 specifies MCS variation MC1 over that one or those very few subcarriers and MCS variation MC3 over the remaining relatively noise-free subcarriers for time interval 708. Time intervals 709 and 710 are relatively noise-free over all subcarriers, so MSC map 700 specifies MCS variation MC3 over all subcarriers. As the next time interval after time interval 710 will be a second instance of time interval 703, MCS map 700 specifies a three temporally contiguous time intervals 709, 710, and 703 where MCS variation MC3 is used for all subcarriers.

With the ability to specify, on a per time interval and per frequency interval basis, the MCS variation to be used for the respective frequency interval during the respective time interval, MCS map 700 can provide an optimal aggregation of rates with optimal robustness using optimal combinations of MCS variations in response to channel conditions, such as SNR, over frequency and time.

In accordance with at least one embodiment, a method in an orthogonal frequency division multiplexed (OFDM) communication system includes receiving, in a receiver, from a medium a channel measurement packet of a communication channel, the channel measurement packet having a measured transmission characteristic, comparing the measured transmission characteristic of the received channel measurement packet to a defined transmission characteristic to provide a comparison, generating a modulation coding scheme (MCS) map referenced to a phase of a cyclostationary noise period of the medium based upon the comparison, sending to a transmitter via the medium the MCS map, receiving, from the medium, signals comprising packets that have been mapped to subcarriers based on the MCS map, and demapping subcarriers of the signals received from the medium using the MCS map referenced to the phase of the cyclostationary noise period of the medium.

The method can further include requesting transmission of the channel measurement packet by the transmitter. The method can further include performing zero-crossing detection in the receiver to determine the phase of the cyclostationary noise period of the medium, wherein the medium is a power line medium, wherein the phase is a power phase of the power line medium. The method can further include interpolating the MCS map to track the phase of the cyclostationary noise period when OFDM symbols are not temporally aligned with instances of the cyclostationary noise period or multiples or submultiples thereof. The method can further include compressing the MCS map before the sending to the transmitter the MCS map. The method can further include repeating the receiving, the comparing, the generating, and the sending with respect to an updated MCS map to adapt the method to changes in the measured transmission characteristic. The MCS map can represent a time period of at least one half of the cyclostationary noise period.

In accordance with at least one embodiment, a method in an orthogonal frequency division multiplexed (OFDM) communication system includes transmitting, from a transmitter, a channel measurement packet having a measured transmission characteristic over a communication channel on a medium, receiving a modulation coding scheme (MCS) map generated from a comparison of the measured transmission characteristic of the channel measurement packet, once received, to a defined transmission characteristic over at least one half of a cyclostationary noise period, and mapping subcarriers for transmission of packets over the medium using the MCS map referenced to a phase of the cyclostationary noise period.

The method can further include receiving a request for transmission of the channel measurement packet. The method can further include performing zero-crossing detection in the transmitter to determine the phase, wherein the medium is a power line medium, wherein the phase is a power phase of the power line medium. The method can further include interpolating the MCS map to track the phase. The method can further include decompressing the MCS map after receiving the MCS map. The method can further include repeating the transmitting, the receiving, and the mapping with respect to an updated MCS map to adapt the method to changes in the measured transmission characteristic. The mapping the subcarriers using the MCS map referenced to the phase can impose a limit on a frame size of the packets as a function of a signal-to-noise ratio (SNR) of the communication channel.

In accordance with at least one embodiment, an apparatus for orthogonal frequency division multiplexed (OFDM) communication includes a receiver for receiving over a medium a channel measurement packet of a communication channel having a measured transmission characteristic, a modulation coding scheme (MCS) map generator for providing a MCS map to adaptively load bits in time and frequency for OFDM communication based upon a comparison of the measured transmission characteristic of the channel measurement packet to a defined transmission characteristic, and a MCS demapper for demapping subcarriers of signals comprising packets received over the medium using the MCS map referenced to a phase of a cyclostationary noise period of the medium.

The apparatus can further include a zero-crossing detector for determining the measured transmission characteristic relative to the phase based on the received channel measurement packet. The MCS map can represent a time period of at least one half of the cyclostationary noise period. The apparatus can further include an interpolating module for interpolating the MCS map to track the phase. The apparatus can further include a compression module for compressing the MCS map before the sending the MCS map to a transmitter. The apparatus can further include a control module for causing the MCS map generator to repeat the providing the MCS map to provide a new MCS map and for causing the MCS demapper to repeat the demapping subcarriers using the new MCS map referenced to the phase.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

Also, the concepts have been described with reference to specific embodiments. However, one of ordinary skill in the art appreciates that various modifications and changes can be made without departing from the scope of the present disclosure as set forth in the claims below.

It will be appreciated that, insofar as embodiments are implemented by a computer program, then a nontransitory storage medium carrying the computer program forms an aspect of the corresponding claimed subject matter. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system or processing device. The transmission medium may be, as examples, a CD-ROM, a diskette, a non-volatile memory device, or the like.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method in an orthogonal frequency division multiplexed (OFDM) communication system comprising:
   comparing a measured transmission characteristic of a received channel measurement packet received over a medium by a receiver to a defined transmission characteristic to provide a comparison;

generating a modulation coding scheme (MCS) map referenced to a phase of a cyclostationary noise period of the medium based upon the comparison;

sending the MCS map to a transmitter via the medium;

receiving, from the medium, signals comprising packets that have been mapped to subcarriers based on the MCS map; and demapping subcarriers of the signals received from the medium using the MCS map referenced to the phase of the cyclostationary noise period of the medium.

2. The method of claim 1 further comprising:
requesting transmission of the channel measurement packet by the transmitter.

3. The method of claim 1 further comprising:
performing zero-crossing detection in the receiver to determine the phase of the cyclostationary noise period of the medium, wherein the medium is a power line medium, wherein the phase is a power phase of the power line medium.

4. The method of claim 1 further comprising:
interpolating the MCS map to track the phase of the cyclostationary noise period when OFDM symbols are not temporally aligned with instances of the cyclostationary noise period or multiples or submultiples thereof.

5. The method of claim 1 further comprising:
compressing the MCS map before the sending to the transmitter the MCS map.

6. The method of claim 1 further comprising:
repeating the receiving, the comparing, the generating, and the sending with respect to an updated MCS map to adapt the method to changes in the measured transmission characteristic.

7. The method of claim 1 wherein the MCS map represents a time period of at least one half of the cyclostationary noise period.

8. A method in an orthogonal frequency division multiplexed (OFDM) communication system comprising:
transmitting, from a transmitter, a channel measurement packet having a measured transmission characteristic over a communication channel on a medium;

receiving a modulation coding scheme (MCS) map generated from a comparison of the measured transmission characteristic of the channel measurement packet, once received, to a defined transmission characteristic over at least one half of a cyclostationary noise period; and mapping subcarriers for transmission of packets over the medium using the MCS map referenced to a phase of the cyclostationary noise period.

9. The method of claim 8 further comprising:
receiving a request for transmission of the channel measurement packet.

10. The method of claim 8 further comprising:
performing zero-crossing detection in the transmitter to determine the phase, wherein the medium is a power line medium, wherein the phase is a power phase of the power line medium.

11. The method of claim 8 further comprising:
interpolating the MCS map to track the phase.

12. The method of claim 8 further comprising:
decompressing the MCS map after receiving the MCS map.

13. The method of claim 8 further comprising:
repeating the transmitting, the receiving, and the mapping with respect to an updated MCS map to adapt the method to changes in the measured transmission characteristic.

14. The method of claim 8 wherein the mapping the subcarriers using the MCS map referenced to the phase imposes a limit on a frame size of the packets as a function of a signal-to-noise ratio (SNR) of the communication channel.

15. Apparatus for orthogonal frequency division multiplexed (OFDM) communication comprising:
a receiver for receiving over a medium a channel measurement packet of a communication channel having a measured transmission characteristic;

a modulation coding scheme (MCS) map generator for providing a MCS map to adaptively load bits in time and frequency for OFDM communication based upon a comparison of the measured transmission characteristic of the channel measurement packet to a defined transmission characteristic; and a MCS demapper for demapping subcarriers of signals comprising packets received over the medium using the MCS map referenced to a phase of a cyclostationary noise period of the medium.

16. The apparatus of claim 15 further comprising:
a zero-crossing detector for determining the measured transmission characteristic relative to the phase based on the received channel measurement packet.

17. The apparatus of claim 16 wherein the MCS map represents a time period of at least one half of the cyclostationary noise period.

18. The apparatus of claim 15 further comprising:
an interpolating module for interpolating the MCS map to track the phase.

19. The apparatus of claim 15 further comprising:
a compression module for compressing the MCS map before the sending the MCS map to a transmitter.

20. The apparatus of claim 15 further comprising:
a control module for causing the MCS map generator to repeat the providing the MCS map to provide a new MCS map and for causing the MCS demapper to repeat the demapping subcarriers using the new MCS map referenced to the phase.

* * * * *